July 20, 1937. G. ORNSTEIN Re. 20,451

ART OF TREATING SEWAGE

Original Filed Dec. 6, 1929

INVENTOR
GEORG ORNSTEIN

BY Arthur Nicholson

ATTORNEY

Reissued July 20, 1937

Re. 20,451

UNITED STATES PATENT OFFICE 20,451

ART OF TREATING SEWAGE

Georg Ornstein, Berlin, Germany

Original No. 1,904,246, dated April 18, 1933, Serial No. 412,093, December 6, 1929. Application for reissue March 30, 1935, Serial No. 13,953. In Germany September 10, 1928

8 Claims. (Cl. 210—2)

The present invention relates to the treatment of sewage and contemplates an improved process of sewage purification and apparatus for carrying the said process into practice.

It has been heretofore attempted to purify sewage by the direct addition to the raw sewage of coagulants, such as lime, alum, copperas and the like and after such chemical treatment, allowing the sewage to stand in settling basins in order to permit settling of precipitated sludge. While processes of this type were capable of yielding a fairly clear effluent, disadvantages and difficulties were encountered due to the colloidal and slimy nature of the precipitated sludge. In order to handle and to dewater this sludge, it had to be spread out on sludge beds where, as soon as putrescence set in, the spread sludge became the cause of considerable trouble.

The object of the present invention is to provide a process and suitable apparatus therefor whereby sewage may be efficiently and economically purified to yield a very clear effluent and to produce a substantially dewatered and conveniently handleable sludge.

Although in my new process I employ as a part thereof chemical coagulants such as have heretofore been proposed, I do so in such a manner as to realize the advantages of the chemical effect more efficiently, while at the same time avoiding and overcoming the difficulties and disadvantages which were attendant upon the older processes.

My new process furthermore effects a substantial economy in the consumption of chemical coagulating agents.

Other objects and advantages will become apparent from the following description taken in conjunction with the accompanying drawing which illustrates diagrammatically apparatus appropriate for carrying the method into practice.

In said drawing:—

Figure 1:
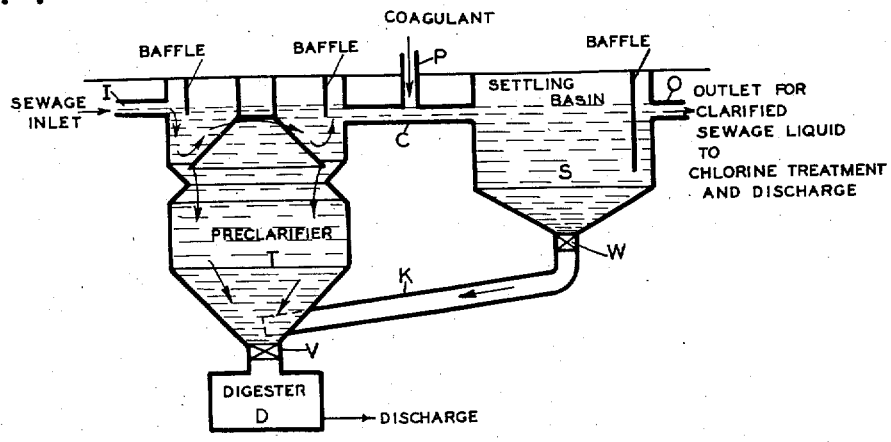

Fig. 1 shows an arrangement according to which the effluent from the pre-clarification is subjected to chemical dosing and settling or secondary sedimentation which is followed by collecting the resulting settled or sedimented chemically precipitated sludge and the passing of such collected chemically coagulated sludge directly to the digester wherein mixing and digesting of raw sludge and chemically coagulated sludge is carried out.

Figure 2:
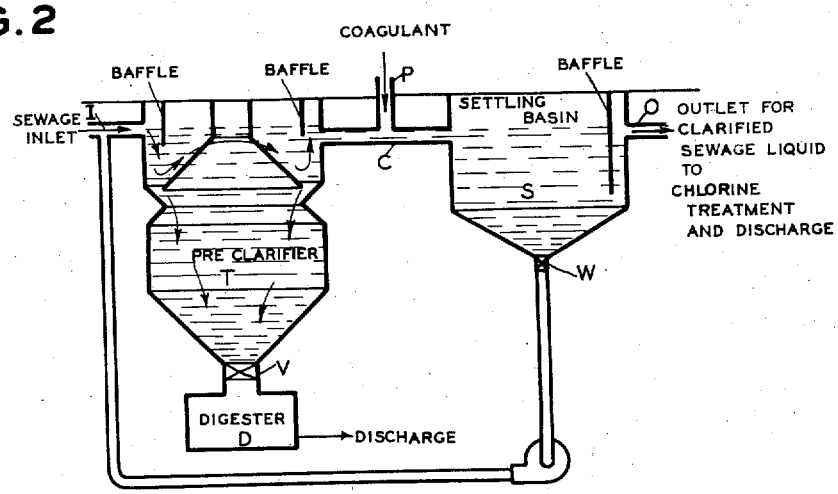

Fig. 2 shows an arrangement similar to Fig. 1, but in which the collected chemically coagulated sludge withdrawn from the settling or sedimentation zone is conducted to the inlet side of the pre-clarifier or primary sedimentation zone T.

As shown in the drawing, raw sewage is passed from an inlet I to a settling tank T, preferably an Imhoff tank, wherein pre-clarifying operation is effected by permitting sludge to settle by gravity. The sludge collects on the sloped bottom of the tank and is drawn off through valve V into a digesting vessel D. In this vessel the sludge is exposed to digestion by micro-organisms according to principles well known in the art of sewage treatment. The digestion carried out in the vessel B is essentially an alkaline digestion by anaerobic micro-organism. In this type of digestion, in order that a sludge be properly digested, it must, as is the case when the sludge from the pre-clarifier T is introduced into the digester D, have a liquid consistency so that it may be turned over and over by the gas generated in the course of anaerobic digestion, affording a uniform mineralization of the entire mass.

The pre-clarified sewage is withdrawn from tank T via channel C to a second settling basin S. To the pre-clarified sewage is added a suitable coagulant, preferably in aqueous solution, for chemically precipitating a sludge, as, for example, through pipe P leading to channel C or some other appropriate point. Any suitable acid or acid reacting coagulant such as sulfuric acid, aluminum sulfate, copperas, chlorine, chlorine compounds, and the like, may be employed.

After the sewage has been thus mixed with the acid type of chemical coagulant, it is thereupon allowed to stand in the settling basin S where the chemically precipitated sludge settles to the bottom, while the clear effluent flows away through the outlet O.

The sludge collected in basin S is withdrawn and combined with the sludge in digester D in any suitable manner. A conduit K controlled by valve W may be used for flowing the sludge from the bottom of basin S to digester D. In place of carrying the chemically precipitated sludge directly to the digester, it may be conducted to the inlet I of the pre-clarifying tank T.

It will be noted that the arrangement by which there is a direct passing of chemically coagulated sludge from the second settling basin or secondary sedimentation tank S directly to the digester is diagrammatically illustrated in Fig. 1, while the arrangement whereby the chemically coagulated sludge from said second settling basin may be conducted to the inlet of the pre-clarifier or primary sedimentation tank T is diagrammatically illustrated in Fig. 2.

For the purpose of convenience for ready reference, the pre-clarifying step or apparatus is herein sometimes referred to as the primary sedimentation or primary clarifier, while the operation carried out in the second settling basin S is sometimes referred to as the secondary sedimentation or secondary clarification, while the apparatus or tank thereof is correspondingly referred to as the secondary sedimentation tank or secondary clarifier. The coagulant introduced at P into the effluent from the pre-clarifier is sometimes referred to, and properly so, as the acid chemical coagulant even though strictly speaking the coagulant is not an acid before or at the time of application, nevertheless upon application it forthwith functions as an acid incident to the reaction following the introduction of the coagulant into the sewage or clarified effluent, the latter of which is frequently referred to as pre-clarified sewage. Primary sedimentation and the secondary sedimentation referred to herein in fact constitute important factors of primary and secondary dewatering operation and sometimes are referred to under this broad nomenclature, and the effluent leaving each of these sedimentation zones is properly referred to as the effluent leaving the zone wherein the dewatering takes place. The transfer of chemically coagulated sludge from the secondary sedimentation zone to the sewage inlet I, whereby chemically coagulated sludge is introduced into the sewage undergoing clarification, to wit, at some time prior to the completion of the pre-clarification, may be broadly referred to as a secondary dosing operation according to which the chemically coagulated sludge can be employed for aiding and furthering the precipitating or sedimentation operation carried out in the primary sedimentation or primary de-watering zone.

In either case it is apparent that the pre-clarified sewage will thus, at least partially, have the benefit of a chemical treatment from the liquid accompanying the chemically pre-clarified sludge. It is also apparent that the several sludges are not separately de-watered but prior to de-watering are exposed, together, as mixed sludges, to a micro-organism digestion stage in a condition of liquid consistency at least as fluid as that at which they leave their respective tanks, whereby the mixed sludges are given the opportunity previously referred to of being turned over and over by the gas generated in the course of digestion, affording a uniform mineralization of the entire mass of the thoroughly intermixed and commingled mass.

By combining the two sludges in the aforesaid manner, the chemically treated sludge is also digested by micro-organisms this being effected in admixture with the pre-clarified sludge and is, together with the pre-clarified sludge, changed into a form which is easily de-watered.

The clarified sewage or effluent which leaves settling basin S via outlet O may be conducted to a receiving stream or body of water, but it is preferably first subjected to the action of chlorine or chlorine compounds so as to destroy bacteria and other organisms. As will be seen by reference to the drawing, the entire process can be conducted as a continuous process from the standpoint of a continuous flow of sewage through the inlet I without the necessity of manipulating any valves in the line I during the progress of any part of the process from beginning to end.

It will be observed that the new process hereinabove described contemplates postponing treatment with coagulating chemicals until after a pre-clarifying operation of a physical nature such as is involved in a gravity settling tank and a digestion of the sludge separated in the physical step with micro-organisms or the like and the addition to said sludge in the process of its digestion, via a direct or indirect path, of the sludge which is precipitated in the chemical stage of the treatment of the sewage which remains after the physical step has functioned.

The invention as thus described contemplates (*a*) the pre-clarification of sewage in any manner such as by settling, (*b*) the separation of the sludge deposited in the said pre-clarification, (*c*) the digestion of said separated sludge with any appropriate agency such as micro-organism, (*d*) the withdrawal from the pre-clarification stage of the pre-clarified sewage, (*e*) the introduction to said pre-clarified sewage of chemical coagulants, (*f*) the separation of the clear effluent and its delivery, preferably via a system which includes treatment with chlorine, to a receiving stream or other appropriate place of discharge, and (*g*) the separation of the sludge deposited as a result of the chemical treatment and its addition subsequently to the sludge undergoing digestion.

From the disclosures hereof, which are in accord with the disclosures of the specification as originally filed upon which the patent being reissued is based, it will be noted that while the invention as described contemplates the several features enumerated in the paragraph last preceding there is also disposed what may be considered as certain broad features or aspects of the invention. More particularly, such aspects as relate to steps according to which sludge essentially containing chemically coagulated solids is obtained and of which the digestible portions of such chemically precipitated solids are digested by adding or introducing the sludge to or into a sludge undergoing digestion, that is, to or into a body of digesting sludge. Said digesting sludge is maintained in digesting condition by having supplied thereto sludge which contains settleable raw solids, to wit, solids which existed in the sewage prior to the addition thereto of the precipitating or coagulating chemical.

To express the foregoing in a different way, if a sludge containing the chemically coagulated solids is added to a digesting sludge which is maintained in a digesting state because of the supplying thereto of a sewage sludge containing settleable raw solids, it is possible to effect—in fact, by a continuous process—the digesting of the sludge essentially containing solids which have been chemically precipitated.

The process or processes herein specifically described disclose and accomplish the features just mentioned.

Acknowledgment is hereby made of the fact that during the pendency of this re-issue patent there was cited the U. S. patent to Imhoff No. 1,820,977 dated September 1, 1931, which patent describes a process wherein there is produced and treated activated sludge.

Activated sludge comprises sewage solids made settleable by aerating the sewage sufficiently to stimulate aerobic bacteria therein to an extent where they predominate over other types particularly over anaerobic types. Thus activated sludge may be said to be a cultivated product of cultured baterial activity. The resulting sludge is fluffy or flocculent and difficultly settleable, whereas chemical sludge which is coagulated in distinction from biological or cultured processes, is colloidal, slimy, compact, muddy and easily settleable. These two types of sludge are readily distinguishable as to physical characteristics and as to digestibility.

I have filed an application in Germany, Sept. 10, 1928.

I claim:

1. The improvement in the art of purification of sewage by coagulants which comprises pre-clarifying the sewage by settling sludge therefrom prior to treatment with a coagulant, combining the aforesaid sludge with chemically precipitated sludge obtained from coagulation treatment without stimulated aerobic activity, and exposing said combined sludges to a common digestion treatment effective upon the intermixed sludges in a state of liquid consistency during the course of the said digestion treatment.

2. Apparatus for use in the treatment of sewage which comprises a pre-clarifying tank having an inlet for raw sewage, an outlet for pre-clarified sewage and an outlet for settling sludge, a digester connected to said sludge outlet for the digestion of sludge, a settling tank connected to the said outlet for pre-clarified sewage means for introducing a chemical coagulant into said pre-clarified sewage without the employment of any aerating means functioning to stimulate the culture of aerobic bacteria in the pre-clarified sewage effluent whereby any resulting sedimented sludge following the introduction of the chemical coagulant is essentially a chemically and non-biologically developed sludge, an outlet connected with said settling tank for leading off the clarified sewage effluent, a bottom provided on said settling tank for accumulating sludge, and means associated with said bottom for conducting sludge sedimented in the settling tank to the sludge of the pre-clarifying tank.

3. Apparatus for use in the treatment of sewage which comprises a pre-clarifying tank having an inlet for raw sewage, an outlet for pre-clarified sewage and an outlet for settling sludge, a digester connected to said sludge outlet for the digestion of sludge, a settling tank connected to the said outlet for pre-clarified sewage, means for introducing a chemical coagulant into said pre-clarified sewage, an outlet connected with said settling tank for leading off the clear sewage effluent, a bottom provided on said settling tank for accumulating sludge, and a conduit leading from said tank bottom to the aforesaid digester for conducting sludge precipitated in the settling tank to the digester.

4. A continuous process of treating sewage which comprises establishing a continuous flow of raw sewage, subjecting said sewage to pre-clarification to obtain a sludge and pre-clarified sewage, withdrawing the thus pre-clarified sewage and treating it after said withdrawal with chemical coagulants that effect acid reactions and without subsequent air-stimulated cultivation of aerobic bacteria to cause conditions favorable to sedimentation of chemically precipitated sludge from the thus treated pre-clarified sewage, drawing off the effluent, introducing the resulting sedimented sludge following application of the coagulating chemical and the sludge of the pre-clarification step into a common receiver and therein exposing them as intermixed sludges to a common anaerobic digestion treatment effective upon the intermixed sludges in a state of liquid consistency during the course of the said digestion treatment.

5. Apparatus for use in the treatment of sewage by operations involving pre-sedimentation, intermediate treatment of the supernatant liquid from the pre-sedimentation with suitable coagulant typefied by sulphuric acid, aluminum sulfate, copperas, chlorine, chlorine compounds and the like without any cultural aeration of the supernatant conducive to the stimulation and development of aerobic bacteria, subsequent sedimentation of the thus chemically treated supernatant liquid and the ultimate anaerobic digestion of sludges derived as the result of and from said sedimentations in contradistinction to processes involving aeration between primary and secondary sedimentations to produce a cultured aerobic sludge preparatory to ultimate digestion, which apparatus comprises a pre-clarifying tank having an inlet by which raw sewage is delivered into the tank, an upper outlet by which supernatant liquid is passed as relatively clarified sewage from the upper portion of the pre-clarifying tank, a lower raw sewage discharge by which sedimented raw sludge is passed from the pre-clarifying tank, a digester provided for the digestion of sludge passed thereto, a conduit leading from said lower raw sludge discharge to said digester, a settling tank, a conduit leading from the aforesaid upper outlet to said settling tank and provided for delivering the clarified sewage when chemically dosed into said settling tank, said conduit having means for introducing a chemical coagulant into said clarified sewage while the clarified sewage is within and is in transit along the conduit from the pre-clarifying tank to the settling tank and without the employment of any cultural aeration for developing aerobic bacteria in the clarified sewage whereby within the settling tank there is realized a sedimented essentially chemically precipitated colloidal and slimy sludge, said settling tank having a bottom whereupon there is accumulated said chemically precipitated sludge, and means associated with said bottom for conducting the sludge thus obtained by sedimentation in the settling tank to the raw sewage inlet leading to the pre-clarifying tank.

6. Apparatus for use in the treatment of sewage which comprises a pre-clarifying tank having an inlet for raw sewage, an outlet for clarified sewage and an outlet for settled sludge; a digester connected to said sludge outlet for the digestion of sludge, a settling tank connected to said outlet for clarified sewage, means for introducing into said clarified sewage an acid chemical functioning as a coagulating agent without any cultural aerating means functioning to develop a predominance of aerobic bacteria in the pre-clarified sewage, an outlet connected with said settling tank for leading off the clarified sewage effluent, a bottom provided on said settling tank for accumulated sludge, and means associated with said bottom for conducting chemically coagulated slimy sludge sedimented in the settling tank to the sludge obtained from said pre-clarifying tank without any chemically coagulated sludge being introduced into the raw sewage prior to the delivery of the raw sewage into the pre-clarifying tank.

7. The process for treating sewage and the like which comprises the physical step of passing raw sewage through a settling tank wherein the solids normally in raw sewage settle in the form of sludge, exposing raw sludge resulting from the physical step to micro organism digestion in a digester, the chemical step of adding to the sewage from which sludge has been settled by the physical step a chemical for effecting therewith a chemically coagulating action from which there results a precipitated colloidal and slimy sludge in settleable form, separating the sludge of the chemical step from the sewage, and adding the separated chemical sludge to the raw sludge undergoing digestion in the digester.

8. In the treatment of sewage a process comprising subjecting the incoming sewage to pre-sedimentation in a pre-clarifying zone, conducting clarified supernatant resulting from said pre-sedimentation along one path leading from the pre-clarifying zone to a subsequent sedimentation zone, conducting sedimented sludge derived from said pre-sedimentation along another path leading from the clarifying zone to a digesting zone wherein there exists a body of sludge undergoing anaerobic digestion and in said last mentioned zone exposing the sludge conveyed thereto to anaerobic digestion, introducing an acid chemical coagulant and precipitant into the clarified effluent from the pre-clarifying zone and subjecting the thus dosed effluent to sedimentation in the subsequent sedimentation zone without the dosed effluent being subjected to aeration for effecting aerobic action in respect to the clarified effluent prior to the sedimentation in the subsequent sedimentation zone being effected and whereby in said subsequent sedimentation zone there is realized an acid type of sediment which is essentially a precipitated colloidal and slimy sludge the precipitation of which was effected and furthered by the employment of the aforementioned acid chemical coagulant and precipitant, conducting the clarified effluent derived as the result of the subsequent sedimentation along one path, and conducting the acid sediment derived as sludge as the result of the subsequent sedimentation along another path leading from the subsequent sedimentation zone to a locality at which said acid sediment is ultimately exposed to anaerobic digestion in the digestion zone in the presence of sedimented raw sludge passed thereto from the preclarifying zone.

GEORG ORNSTEIN.